(12) United States Patent
Kamp et al.

(10) Patent No.: US 9,175,991 B2
(45) Date of Patent: Nov. 3, 2015

(54) METHOD OF FORMING A PITOT TUBE VALVE ASSEMBLY WITH AN ANTI-ROTATION MECHANISM

(75) Inventors: Josh Kamp, Glastonbury, CT (US); Michael T. Burnickas, Westfield, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 671 days.

(21) Appl. No.: 13/449,719

(22) Filed: Apr. 18, 2012

(65) Prior Publication Data

US 2012/0198697 A1 Aug. 9, 2012

Related U.S. Application Data

(62) Division of application No. 12/914,462, filed on Oct. 28, 2010, now Pat. No. 8,234,935.

(51) Int. Cl.
*G01F 1/46* (2006.01)
*G01F 15/14* (2006.01)
*G01F 15/00* (2006.01)
*B23P 15/00* (2006.01)

(52) U.S. Cl.
CPC .............. *G01F 1/46* (2013.01); *G01F 15/005* (2013.01); *G01F 15/006* (2013.01); *G01F 15/14* (2013.01); *B23P 15/001* (2013.01); *Y10T 29/49419* (2015.01); *Y10T 29/49826* (2015.01); *Y10T 29/49885* (2015.01)

(58) Field of Classification Search
CPC ......... G01F 1/46; G01F 15/006; G01F 15/14; G01F 15/005; Y10T 29/49826; Y10T 29/49885; Y10T 29/49419; B23P 15/001
See application file for complete search history.

(56) References Cited

U.S. PATENT DOCUMENTS

| 3,982,808 | A | | 9/1976 | Marechal |
| 4,016,768 | A | | 4/1977 | Mashburn et al. |
| 4,124,036 | A | * | 11/1978 | Rogers ........................ 137/375 |
| 4,717,159 | A | | 1/1988 | Alston et al. |
| 4,872,807 | A | | 10/1989 | Thompson |
| 5,069,073 | A | | 12/1991 | Barrett |
| 5,073,147 | A | | 12/1991 | Takano et al. |
| 5,235,746 | A | * | 8/1993 | Leonard ................... 29/890.128 |
| 5,448,881 | A | | 9/1995 | Patterson et al. |
| 5,509,313 | A | | 4/1996 | Traina et al. |
| 5,535,634 | A | | 7/1996 | Traina et al. |
| 5,693,125 | A | | 12/1997 | Dean |

(Continued)

FOREIGN PATENT DOCUMENTS

GB 287737 3/1928
GB 2164159 3/1986

OTHER PUBLICATIONS

Extended European Search Report issued in EP11250861, Apr. 24, 2014, 8 pages.

*Primary Examiner* — Sarang Afzali
(74) *Attorney, Agent, or Firm* — Cantor Colburn LLP

(57) ABSTRACT

A valve assembly is provided and includes a pitot tube having an angled tip to extract from a duct formed by a housing a sample of a fluid to be communicated to an actuator configured to operate the duct, the pitot tube being disposed within the housing whereby the pitot tube is fixed longitudinally between the actuator and the housing and laterally within the housing and an anti-rotation mechanism coupled with the pitot tube to rotationally secure the pitot tube such that the angled tip is fixed to face rearwardly.

4 Claims, 3 Drawing Sheets

(56) References Cited

U.S. PATENT DOCUMENTS

| | | |
|---|---|---|
| 5,811,691 A | 9/1998 | Jackson |
| 5,895,079 A * | 4/1999 | Carstensen et al. ........... 285/333 |
| 5,938,147 A | 8/1999 | DeGroff |
| 5,997,243 A | 12/1999 | Shaw |
| 6,059,522 A | 5/2000 | Gertz et al. |
| 6,164,143 A | 12/2000 | Evans |
| 6,431,828 B1 | 8/2002 | Quinn |
| 6,820,581 B2 * | 11/2004 | Vene .......................... 123/90.48 |
| 7,155,968 B2 | 1/2007 | Collot et al. |
| 7,832,076 B2 * | 11/2010 | Fischer .......................... 29/507 |
| 2012/0160938 A1 * | 6/2012 | Saito et al. .................. 239/585.1 |

* cited by examiner

US 9,175,991 B2

METHOD OF FORMING A PITOT TUBE VALVE ASSEMBLY WITH AN ANTI-ROTATION MECHANISM

CROSS-REFERENCE TO RELATED APPLICATION

The present application is a divisional application that claims the benefit of priority to U.S. application Ser. No. 12/914,462, which is entitled "ANTI-ROTATION MECHANISM FOR PITOT TUBE," and was filed on Oct. 28, 2010. The entire contents of U.S. application Ser. No. 12/914,462 are incorporated herein by reference.

BACKGROUND OF THE INVENTION

The subject matter disclosed herein relates to a valve assembly and, more particularly, to a valve assembly having an anti-rotation mechanism for a pitot tube.

A pneumatically actuated butterfly valve opens and closes a duct through which fluid passes from an upstream end to a downstream end. Some valves operate in accordance with a measurement of the pressure of the fluid at the upstream end. That is, when they detect that the upstream pressure is too high or beyond a predefined threshold, they close at least partially to lower the downstream pressure. By contrast, when the upstream pressure is low, they open to allow more fluid through the duct.

The upstream pressure is detected by way of a pitot tube positioned such that its tip is placed in the fluid. The pitot tube is used to communicate a sample of the fluid to a valve actuator where the fluid pressure can be extracted and a determination can be made to open or close the valve. To this end, the pitot tube has an angled tip that is designed to discourage debris from entering the tube. In order for the pitot tube to be effective, however, the angled tip must face in the reward direction and the pitot tube must be prevented from rotating. Typically, this is accomplished by the use of a high temperature adhesive, such as Stycast 2762, but it has been seen that the actual operating temperature of the fluid often exceeds this and other adhesive's capability. As such, pitot tubes often rotate to an undesired orientation.

BRIEF DESCRIPTION OF THE INVENTION

According to one aspect of the invention, a valve assembly is provided and includes a pitot tube having an angled tip to extract from a duct formed by a housing a sample of a fluid to be communicated to an actuator configured to operate the duct, the pitot tube being disposed within the housing whereby the pitot tube is fixed longitudinally between the actuator and the housing and laterally within the housing and an anti-rotation mechanism coupled with the pitot tube to rotationally secure the pitot tube such that the angled tip is fixed to face rearwardly.

According to another aspect of the invention, a valve assembly is provided and includes a housing formed to define a duct through which a fluid flows rearwardly from an upstream end, a first through-hole and a slot in association with the first through-hole, an actuator to operate the duct in accordance with a condition at the upstream end, a pitot tube having an angled tip for disposition within the first through-hole to extract a sample of the fluid to be communicated to the actuator and an anti-rotation mechanism coupled with the pitot tube and configured to sit within the slot to rotationally secure the pitot tube such that the angled tip is fixed to face rearwardly.

According to yet another aspect of the invention, a method of forming a valve assembly is provided and includes machining a first through-hole into a housing, machining a slot partially along the first through-hole, coupling an anti-rotation mechanism with a pitot tube to form a pitot tube assembly and installing the pitot tube assembly within the first through-hole such that the anti-rotation mechanism sits within the slot.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
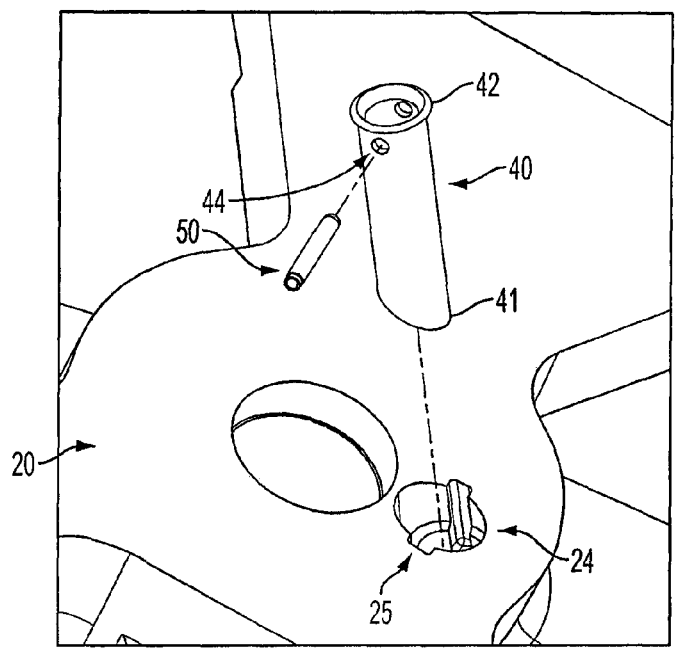
FIG. 1 is an exploded perspective view of an anti-rotation mechanism for a pitot tube.
Figure 2:
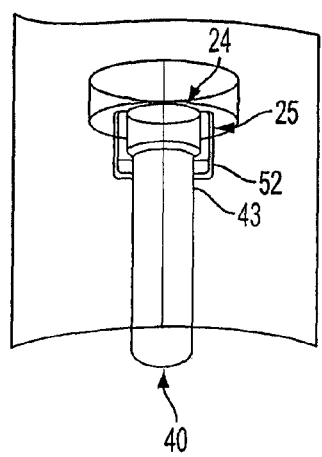
FIG. 2 is an axial view of the anti-rotation mechanism of FIG. 1.
Figure 3:
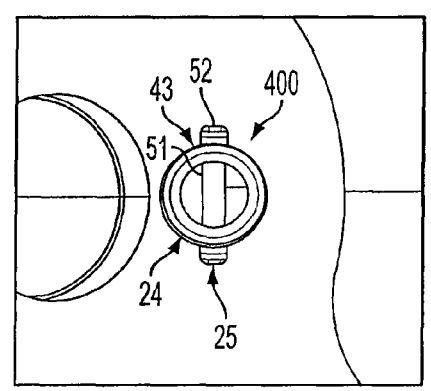
FIG. 3 is a top view of the anti-rotation mechanism of FIG. 1.
Figure 4:
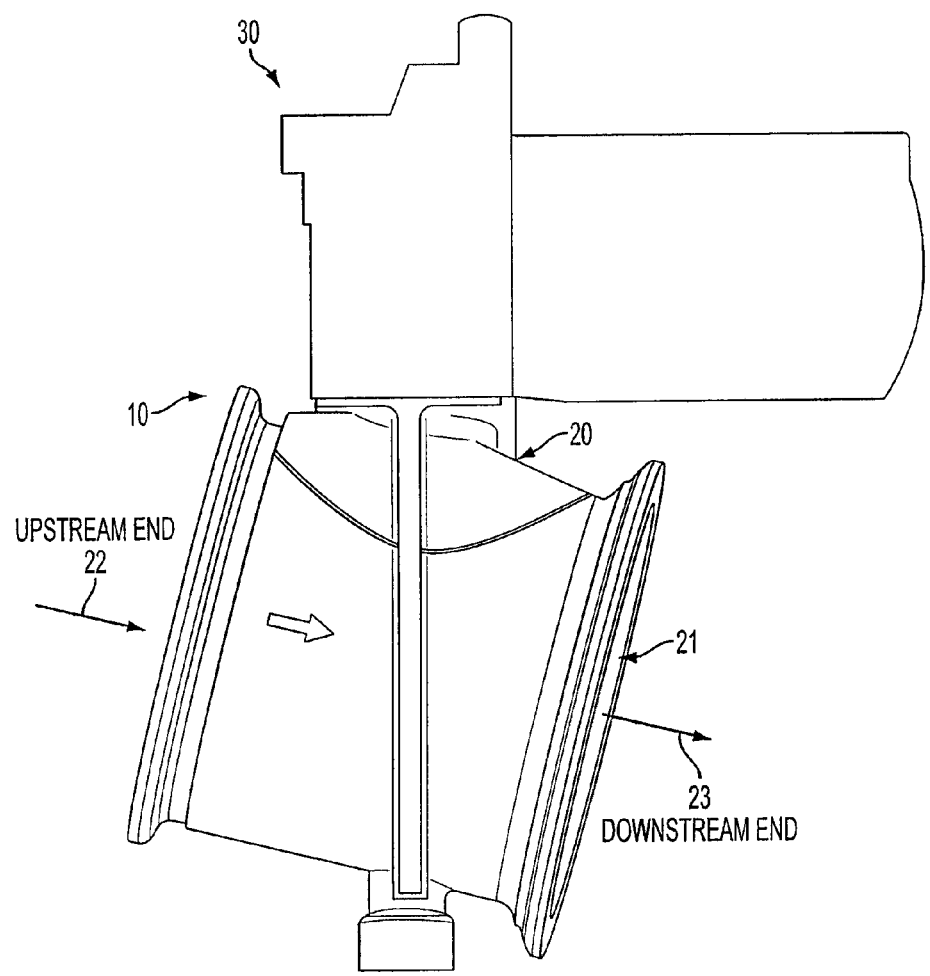
FIG. 4 is a plan view of a valve assembly.

The detailed description explains embodiments of the invention, together with advantages and features, by way of example with reference to the drawings.

DETAILED DESCRIPTION OF THE INVENTION

With reference to FIGS. 1-4, a valve assembly 10 is provided and includes a housing 20, an actuator 30, a pitot tube 40 and an anti-rotation mechanism 50. The housing 20 is formed to define a duct 21 through which a fluid flows in the rearward direction from an upstream end 22 to a downstream end 23. The housing 20 is further formed to define a first through-hole 24 and a slot 25. The first through-hole 24 extends from an upper surface of the housing 20 to an outer diameter of the duct 21 and the slot 25 is formed in association with the first through-hole 24. In some embodiments, the slot 25 extends from the upper surface of the housing 20 and along a partial length of the first through-hole 24 at opposite sides thereof.

The actuator 30 is coupled to the upper surface of the housing 20 and is configured to operate the duct 21, which may include a butterfly valve or a similar type of valve, in accordance with a condition at the upstream end 22. That is, the actuator 30 may open a valve of the duct 21 when it is determined that a pressure of the fluid at the upstream end 22 is low and may close the valve when the upstream fluid pressure is high or above a predetermined threshold.

The pitot tube 40 has an angled tip 41 and is configured for disposition within the first through-hole 24 to extract a sample of the fluid to be communicated to the actuator 30. The condition at the upstream end 22, such as the upstream fluid pressure, is determined from this fluid sample. The pitot tube 40 is a substantially tubular member and may include a flange 42 at its trailing end opposite the angled tip 41. The flange 42 may locate the pitot tube 40 longitudinally within the first through-hole 24 such that the angled tip 41 extends into the fluid flow through the duct 21 such that the fluid sample can be extracted and transmitted along the length of the pitot tube 40.

When the pitot tube 40 is disposed within the first through-hole, as described above, the angled tip 41 faces in the rearward direction such that a testable sample of the fluid is permitted to flow into the pitot tube 40 but excessive amounts of the fluid and/or debris are prevented from flowing into the pitot tube 40. The anti-rotation mechanism 50 is coupled with the pitot tube 40 and configured to sit within the slot 25 to rotationally secure the pitot tube 40 within the first through-hole 24 such that the angled tip 41 is fixed to face in the rearward direction. With the anti-rotation mechanism 50 in use adhesives can be used for secondary retention and sealing, as will be described below, but are not necessary for rotation prevention. Thus, the valve assembly 10 can be adapted for use in higher temperature/pressure conditions than what would otherwise be possible.

The anti-rotation mechanism 50 may be formed of a material that is dissimilar from that of the housing 20 and the pitot tube 40. For example, the anti-rotation mechanism 50 may be formed of steel or a steel alloy while the housing 20 and the pitot tube 40 may each be formed of aluminum or an aluminum alloy. With this construction, in order to prevent galvanic corrosion, the anti-rotation mechanism may be wet installed and provided with a coating of epoxy primer.

In accordance with embodiments, the anti-rotation mechanism 50 may include a tubular slotted spring 51 that extends through the pitot tube 40 such that ends 52 of the tubular slotted spring 51 protrude from pitot tube sides 43 and so that the protruding ends 52 can sit at the bottom of the slot 25. To this end, the pitot tube 40 may be formed to define a second through-hole 44 extending through the sides 43. The tubular slotted spring 51 includes a body portion extending circumferentially such that ends of the body portion nearly meet to thereby define a longitudinal slot. The tubular slotted spring 51 can therefore be squeezed to fit within the second through-hole 44 and subsequently released to assume a secure fit therein.

Once the tubular slotted spring 51 in inserted into the pitot tube 40, the resulting pitot tube assembly 400, which includes the pitot tube 40 and the tubular slotted spring 51, can be disposed within the first through-hole 24 with the protruding ends 52 aligned with and sitting within the slot 25. Once the pitot tube 40 is disposed within the first through-hole 24, the abutment of the protruding ends 52 and the sidewalls of the slot 25 prevent pitot tube 40 rotation. In accordance with embodiments, the first through-hole 24 and the second through-hole 44 may be oriented transversely with respect to one another and, as such, the pitot tube 40 and the tubular slotted spring 51 may also be oriented substantially transversely with respect to one another. In accordance with further embodiments, the pitot tube 40 and the tubular slotted spring 51 may be perpendicular to one another.

Figure 5:
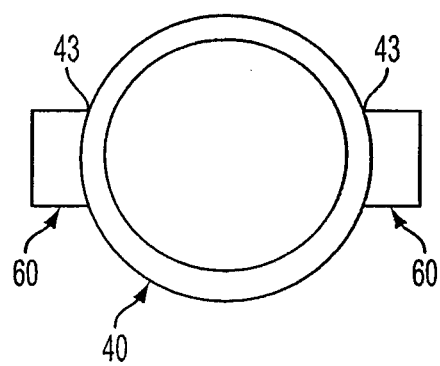
FIG. 5 is a top view of an anti-rotation mechanism according to alternate embodiments.
Figure 6:
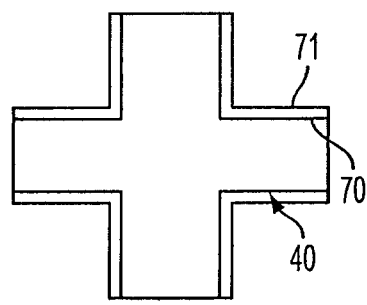
FIG. 6 is a top view of an anti-rotation mechanism according to alternate embodiments.

With reference to FIGS. 5 and 6, it is to be understood that, in accordance with alternate embodiments, other anti-rotation mechanisms 50 are available. These include bosses 60 (see FIG. 5), which may be coupled to the pitot tube 40 at the sides 43 to sit within the slot 25 and to operate similarly as the protruding ends 52 without the need for a feature extending through the center of the pitot tube 40. The bosses 60 may be adhered to the sides 43 or integrally connected to the pitot tube 40 and may be provided singularly or as a plurality of bosses 60 with even or staggered arrangements with respect to one another. Other alternative embodiments include the formation of the pitot tube 40 with regular or irregular features 70 that abut complementary features 71 of the first through-hole 24 (see FIG. 6). In this way, once the pitot tube 40 is inserted within the first through-hole 24, rotation of the pitot tube 40 is inhibited by the abutment of the features 70 and the complementary feature 71.

Figure 7:
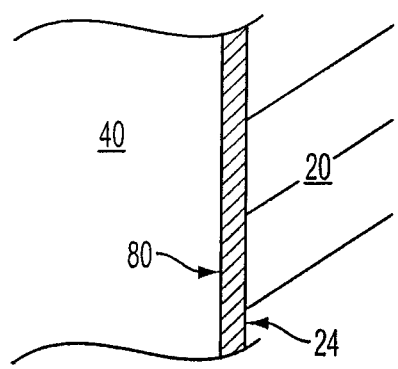
FIG. 7 is an enlarged view of adhesive used with the anti-rotational mechanism of FIG. 1.

With reference to FIG. 7, in order to provide for secondary retention and for sealing purposes, an adhesive 80 may be interposed between the housing 20 and the pitot tube 40. This adhesive 80 may include, for example, a silicone based adhesive or a similar type of adhesive and may be included in the pitot tube assembly 400 as well.

In accordance with aspects of the invention, a method of forming a valve assembly 10 is provided and includes machining a first through-hole 24 into a housing 20, machining a slot 25 partially along the first through-hole 24, coupling an anti-rotation mechanism 50 with a pitot tube 40 to form a pitot tube assembly 400 and installing the pitot tube assembly 400 within the first through-hole 24 such that the anti-rotation mechanism 50 sits within the slot 25. Here, the machining may include at least one of milling and/or electro-dynamic machining. Also, in order to prevent galvanic corrosion between the anti-rotation mechanism 50 and the housing 20 and the pitot tube 40, the anti-rotation mechanism 50 may be coated in epoxy primer.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of forming a valve assembly having a housing, the method comprising:
   machining a first through-hole into the housing;
   machining a slot partially along the first through-hole;
   coupling an anti-rotation mechanism with a pitot tube to form a pitot tube assembly; and
   installing the pitot tube assembly within the first through-hole such that the anti-rotation mechanism sits within the slot,
   wherein the machining of the slot comprises machining the slot to extend from an upper surface of the housing and along a partial length of the first through-hole.

2. The method according to claim 1, wherein the machining of the first through-hole and the machining of the slot each comprises milling.

3. The method according to claim 1, wherein the machining of the first through-hole and the machining of the slot each comprises electro-dynamic machining.

4. The method according to claim 1, further comprising coating the anti-rotation mechanism in epoxy primer.

* * * * *